US008780958B2

(12) United States Patent
Cheng et al.

(10) Patent No.: US 8,780,958 B2

(45) Date of Patent: Jul. 15, 2014

(54) HYBRID BIT EXTRACTION FOR GLOBAL POSITION RECEIVER

(75) Inventors: Haojen Cheng, Santa Clara, CA (US); Feng-Yu Lee, Hsinchu (TW); Qinfang Sun, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 241 days.

(21) Appl. No.: 12/870,577

(22) Filed: Aug. 27, 2010

(65) Prior Publication Data

US 2012/0051402 A1 Mar. 1, 2012

(51) Int. Cl.
*H04B 1/00* (2006.01)

(52) U.S. Cl.
USPC .......... 375/147

(58) Field of Classification Search
CPC ........ H04B 1/707; H04B 7/185; H04B 47/06; G01S 1/00; G01S 3/02; G01S 5/02; G01S 5/14; G01S 19/23; H04J 3/06; H04L 27/00; H04L 27/22
USPC .......... 342/357.76, 357.73, 357.25, 420, 450, 342/463; 375/147, 148, 326, 354, 377; 455/456.1; 701/213; 714/785
See application file for complete search history.

(56) References Cited

U.S. PATENT DOCUMENTS 4,302,845 A 11/1981 McClaughry et al.
4,860,321 A 8/1989 von der Embse
4,862,482 A 8/1989 Patchen
4,872,170 A 10/1989 Fujita
4,881,059 A 11/1989 Saltzberg
5,170,396 A 12/1992 Rivers et al.
5,295,162 A 3/1994 Zarembowitch
5,296,820 A 3/1994 Kawabata
5,491,713 A 2/1996 Kwok et al.
5,517,530 A 5/1996 Gardner
5,526,357 A 6/1996 Jandrell
5,553,098 A 9/1996 Cochran et al.

(Continued)

FOREIGN PATENT DOCUMENTS

EP 0453063 A2 10/1991
JP 5183593 A 7/1993

(Continued)

OTHER PUBLICATIONS

Nik et al.: Implementation of a Dual-Frequency GLONASS and GPS L1 C/A Software Receiver, The Journal of Navigation (2010), 63, pp. 269-287.

(Continued)

*Primary Examiner* — Sam K Ahn
*Assistant Examiner* — Shawkat M Ali
(74) *Attorney, Agent, or Firm* — Bever, Hoffman & Harms, LLP

(57) ABSTRACT

A hybrid bit detection circuit for receiving bits from different global positioning systems, e.g. GPS and GLONASS, can include a frequency lock loop (FLL) for receiving the global positioning bits and removing Doppler frequency error and an integrate and dump (I&D) block coupled to an output of the FLL. A coherent detection circuit can be coupled to an output of the FLL and an output of the integrated and dump block. A differential detection circuit can be coupled to an output of the I&D block. Two parity check blocks can be coupled to outputs of the coherent and differential detection circuits.

32 Claims, 15 Drawing Sheets

(56) References Cited

U.S. PATENT DOCUMENTS

| | | | | |
|---|---|---|---|---|
| 5,778,031 | A | 7/1998 | Hiramatsu | |
| 5,790,610 | A | 8/1998 | Julyan | |
| 5,815,515 | A | 9/1998 | Dabiri | |
| 5,928,293 | A | 7/1999 | Jobling et al. | |
| 6,088,829 | A | 7/2000 | Umemura et al. | |
| 6,121,926 | A | 9/2000 | Belcher et al. | |
| 6,195,400 | B1 | 2/2001 | Maeda | |
| 6,211,815 | B1 | 4/2001 | Richey et al. | |
| 6,297,691 | B1 | 10/2001 | Anderson et al. | |
| 6,515,981 | B1 | 2/2003 | Schilling et al. | |
| 6,567,484 | B1 | 5/2003 | Hirota et al. | |
| 6,757,863 | B2 | 6/2004 | Kaneshige et al. | |
| 6,977,973 | B1 | 12/2005 | Wiggins | |
| 7,073,118 | B2 | 7/2006 | Greenberg et al. | |
| 7,174,502 | B2 | 2/2007 | Miyamoto | |
| 7,254,201 | B2 | 8/2007 | Kim | |
| 7,266,144 | B1 | 9/2007 | Sanders | |
| 7,289,589 | B2 | 10/2007 | Pawlowski et al. | |
| 7,359,460 | B2 | 4/2008 | Schmidt et al. | |
| 7,409,628 | B2 | 8/2008 | Tran et al. | |
| 7,469,023 | B2 | 12/2008 | Vasana | |
| 7,522,100 | B2 | 4/2009 | Yang et al. | |
| 7,533,326 | B2 | 5/2009 | Chambers | |
| 7,587,659 | B2 | 9/2009 | Tran et al. | |
| 7,673,226 | B2 | 3/2010 | Eroz et al. | |
| 7,702,040 | B1 * | 4/2010 | Yuan et al. | 375/326 |
| 7,760,880 | B2 | 7/2010 | Dave et al. | |
| 7,840,887 | B2 | 11/2010 | Pietri et al. | |
| 8,064,351 | B2 | 11/2011 | Reid et al. | |
| 8,433,991 | B2 | 4/2013 | Raman | |
| 2003/0151547 | A1 | 8/2003 | Mauro et al. | |
| 2003/0201935 | A1 | 10/2003 | King et al. | |
| 2005/0012664 | A1 * | 1/2005 | Gerein | 342/361 |
| 2005/0094756 | A1 | 5/2005 | Bertram | |
| 2005/0254415 | A1 | 11/2005 | Hara | |
| 2006/0222058 | A1 | 10/2006 | Simic et al. | |
| 2006/0267695 | A1 | 11/2006 | Keating | |
| 2007/0044006 | A1 | 2/2007 | Yang et al. | |
| 2007/0046534 | A1 | 3/2007 | Ziedan et al. | |
| 2007/0076788 | A1 | 4/2007 | Jia et al. | |
| 2007/0147483 | A1 | 6/2007 | Tang | |
| 2007/0168777 | A1 * | 7/2007 | Regev et al. | 714/718 |
| 2007/0205940 | A1 | 9/2007 | Yang et al. | |
| 2007/0248152 | A1 | 10/2007 | Wang et al. | |
| 2009/0054075 | A1 | 2/2009 | Boejer et al. | |
| 2009/0135664 | A1 | 5/2009 | Demone | |
| 2009/0135674 | A1 | 5/2009 | Matsuzaki | |
| 2010/0134349 | A1 | 6/2010 | Lennen et al. | |
| 2011/0314360 | A1 | 12/2011 | Raman | |
| 2012/0007777 | A1 | 1/2012 | Hammes et al. | |
| 2012/0050096 | A1 | 3/2012 | Cheng et al. | |
| 2012/0093208 | A1 | 4/2012 | Wu et al. | |

FOREIGN PATENT DOCUMENTS

| | | | |
|---|---|---|---|
| RU | 2341898 | C2 | 12/2008 |
| WO | 9513677 | A1 | 5/1995 |
| WO | 9525401 | A1 | 9/1995 |
| WO | 9818202 | A1 | 4/1998 |
| WO | WO03067279 | | 8/2003 |
| WO | WO2005048521 | | 5/2005 |
| WO | 2007054406 | A1 | 5/2007 |
| WO | 2008005589 | A1 | 1/2008 |

OTHER PUBLICATIONS

Schmid et al.: Combined Galileo/GPS Architecture for Enhanced Sensitivity Reception, International Journal of Electronics and Communications, 2005 Elsevier GmbH, pp. 297-306.

International Search Report and Written Opinion—PCT/US2011/047998, International Search Authority—European Patent Office—Apr. 24, 2012.

Bhanot Sunil., "Implementation and Optimization of a Global Navigation Satellite System Software Radio," Ohio University, Nov. 1998, pp. 1-98. Website: http://www.ohiolink.edu/etd/send-pdf.cgi/Bhanot%20Sunil.pdf'acc_num=ohiou1176840392.

* cited by examiner

HYBRID BIT EXTRACTION FOR GLOBAL POSITION RECEIVER

RELATED APPLICATIONS

The present application is related to U.S. patent application Ser. No. 12/870,533, entitled "GLONASS BIT BOUNDARY DETECTION", filed by Atheros Communications, Inc. on Aug. 27, 2010, which is incorporated by reference herein.

BACKGROUND OF THE INVENTION

1. Field of the Invention

The present invention relates to a global position receiver capable of receiving both GPS and GLONASS signals and in particular to using a hybrid bit extraction technique to provide both frequency error correction as well as bit error correction.

2. Related Art

GPS (global positioning system) and GLONASS (global navigation satellite system) are radio-based satellite systems in operation today. To provide global coverage, GPS uses between 24-32 satellites. Assuming the minimum number of 24 satellites, 4 satellites are deployed in each of six orbits. The six orbital planes' ascending nodes are separated by 60 degrees. In this configuration, a minimum of six satellites should be in view from any given point at any time. To provide global coverage, GLONASS includes 24 satellites, wherein 21 satellites can be used for transmitting signals and 3 satellites can be used as spares. The 24 satellites are deployed in three orbits, each orbit having 8 satellites. The three orbital planes' ascending nodes are separated by 120 degrees. In this configuration, a minimum of five satellites should be in view from any given point at any time.

Both GPS and GLONASS broadcast two signals: a coarse acquisition (C/A code) signal and a precision (P code) signal. In general, global position devices, called receivers herein, lock onto the C/A transmission and not the P transmission. The P transmission is much longer than the C/A transmission and therefore is impractical to lock onto, e.g. by using synchronization. Once a lock is established via C/A transmission, the C/A transmission itself can provide a quick P lock.

The C/A codes for GPS and GLONASS, which can be generated as a modulo-2 sum of two maximum length shift register sequences, are selected for good cross-correlation properties. Each GPS satellite transmits its own unique C/A code, which has an identifiable pseudo-random noise code number (PRN#). In contrast, each GLONASS satellite transmits the same C/A code, and is identified by its channel number (CHN#).

The C/A code includes navigation data, which provides information about the exact location of the satellite, the offset and drift of its on-board atomic clock, and information about other satellites in the system. In GPS, the C/A format for the navigation data includes words, frames, and sub-frames. The words are 30 bits long; ten words form one sub-frame; and five sub-frames form one frame. In GPS, the C/A code is 1023 bits long, is transmitted at 1.023 Mbps, and therefore has a repetition period of 1 ms. In GLONASS, the C/A format is strings, wherein each string includes 1.7 sec of navigation data and 0.3 sec of a time mark sequence. Notably, the C/A code in GLONASS is 511 bits long, is transmitted at 511 kbps, and therefore has the same code repetition period (i.e. 1 ms) as GPS.

Differential detection of GPS bits is known by those skilled in the art of global positioning. For example, U.S. Publication 2008/0143594 describes an exemplary differential detection technique including a sliding window. FIG. 1 illustrates a first sliding window 101 of past N×20 ms I/Q samples and a second window 102 of further M×20 ms I/Q samples. The data bit decoding integrates both windows 101 and 102, where each 20 ms I/Q sample corresponds to one data bit and N and M are integers. The coherent integration for window 101 is performed by using the previously decoded bits to demodulate and coherently integrate the demodulated I/Q samples. Thus, decision feedback is used to demodulate and coherently integrate the I/Q samples within window 101. In window 102, multiple symbol differential detection is used to demodulate and coherently integrate the I/Q samples.

Differential detection is then used to decode the data bit (location 103) based on the coherent integration of the previous N×20 ms I/Q samples and the future M×20 ms I/Q samples. This decoding may be performed by computing a phase angle transition between the past and future coherent integrations. In one embodiment, this phase angle transition may be performed by taking a dot product of the two integrations, e.g. by multiplying the future integration against the conjugate of the past integration and taking the real part. After the data bit is decoded, the previous and future sliding windows are moved forward by 20 ms to decode the next data bit. Note that the length of the sliding windows may be changed based on the error rate of the data bits. For example, the length of the sliding windows may be shortened when the signal is weak and the error rate high, whereas the length may be lengthened when the error rate of the data bits becomes small.

Unfortunately, with differential detection, a single decoding error may cause all the following bits to be reversed. However, if one-bit error correction is applied to an erroneous packet by flipping the estimated erroneous bit and the following bits, it may induce false success due to the limitation of a downstream parity check. Specifically, a parity check is useful for detecting two or fewer bit errors. Thus, when considering the 30-bit GPS word, which contains 24 bits of data and 6 bits of parity check, if the bit flipping is performed at the wrong place and generates more than two bit errors, then a parity check may trigger a "pass" because it cannot detect more than two errors.

Therefore, a need arises for a detection system and method that can detect global positioning bits. A further need arises for a detection system and method that can detect both GPS and GLONASS bits with minimum errors and false success rate.

SUMMARY OF THE INVENTION

A hybrid bit detection circuit for receiving global positioning bits is described. This hybrid bit detection circuit can receive bits from different global positioning systems, e.g. GPS and GLONASS. The hybrid detection circuit can include a frequency lock loop (FLL) for receiving the global positioning bits and an integrate and dump (I&D) block coupled to an output of the FLL. A coherent detection circuit can be coupled to an output of the FLL and an output of the integrated and dump block. A differential detection circuit can be coupled to an output of the I&D block. Two parity check blocks can be coupled to outputs of the coherent and differential detection circuits.

Notably, the coherent detection circuit can include a filter (e.g. a low pass filter) coupled to the output of the FLL, a subtractor for subtracting an output of the filter from the output of the FLL, and an FLL noise removal block for receiving outputs of the subtractor and the integrate and dump block. The coherent detection circuit can further include a phase lock loop (PLL) and a PLL control block for resetting the PLL based on output of the subtractor and PLL. A match filter of the coherent detection circuit can determining a maximum likelihood set of bits corresponding to the global positioning bits based on an output of the FLL noise removal block.

In one embodiment, the match filter can provide match results and phase error results to the PLL. In another embodiment, the PLL can provide frequency and phase estimates to the match filter. In yet another embodiment, the match filter can use a phase array, which is sized based on a number of bits of a sliding window.

In one embodiment, the PLL control block can compare an estimated frequency offset between the PLL and the FLL. Specifically, the PLL control block can compute a frequency error based on the estimated frequency offset and can compare the frequency error to a predetermined threshold. The PLL can be reset when the frequency error is equal to or greater than the predetermined threshold.

A system for performing parity checks on a plurality of bits is also described. This system can include first and second parity check blocks and a multiplexer. The first parity check block can be coupled to an output of a coherent detection block, whereas the second parity check block can be coupled to an output of a differential detection block. The multiplexer can select between an output of the first parity check block and an output of the second parity check block. Notably, the plurality of bits are derived from global positioning bits associated with different global positioning systems, e.g. GPS and GLONASS.

In one embodiment, when the global positioning system is GPS, then all words in a sub-frame are required to pass parity to reduce a parity check false alarm rate. In another embodiment, when the global positioning system is GPS, specific bits of a predetermined data field in each sub-frame can be verified to reduce a parity check false alarm rate.

For example, the predetermined data field can be a telemetry (TLM) field and the specific bits can have a fixed synchronization pattern. In this case, when the fixed synchronization pattern is inversed, then all sub-frame bits are flipped. In another example, the predetermined data field can be a time of week (TOW) field and a handover word (HOW) field, and the specific bits can be 17 bits of the TOW and 3 bits of the HOW. In this case, when the 17 bits of the TOW and the 3 bits of the HOW are inversed, then all sub-frame bits are flipped. In yet another example, the predetermined data field can include a second word and a last word of a GPS sub-frame, and the specific bits can include two last parity check bits of the second and last words. In this case, when the two last parity check bits of the second and last words are inversed, then all sub-frame bits are flipped.

In one embodiment, in the first parity check block when the global positioning system is GPS, if bits[0:29] do not pass parity, then bits[n] can be flipped to determine if it passes parity, n being 0 to 29. In another embodiment, in the second parity check block when the global positioning system is GPS, if bits[0:29] do not pass parity, then bits[n:29] can be flipped to determine if it passes parity, n being 0 to 29.

In one embodiment, when the global positioning system is GLONASS, specific bits of a predetermined field in each string can be verified to reduce a parity check false alarm rate. For example, the predetermined field can be a string identification (ID) field, and the specific bits can be 4 bits of the string ID field. In this case, each parity check block can determine whether the 4 bits increment by "1" based on a last 4-bit set, and if not, then that sub-frame can be thrown away. In another embodiment, when the global positioning system is GLONASS, if a number of corrected strings is greater than "1" for a sub-frame, then that sub-frame can be thrown away.

In one embodiment, in the first parity check block when the global positioning system is GLONASS, if bits[0:84] do not pass parity, then bits[n:n+1] can be flipped to determine if it passes parity, n being 0 to 83. In another embodiment, in the second parity check block when the global positioning system is GLONASS, if bits[0:84] do not pass parity, then bit[n] can be flipped to determine if it passes parity, n being 1 to 84.

In one embodiment, the system can further including a multiplexer control circuit that determines whether the first parity check block or the second parity check block provides a better score. The multiplexer control circuit can select the results of whichever of the first and second parity check blocks has successfully decoded a sub-frame. When both the first and second parity check blocks decode a sub-frame successfully, then the multiplexer control circuit can select the results associated with a lower false alarm rate.

DETAILED DESCRIPTION OF THE FIGURES

Note that as used herein, the term "packet" in the context of GPS refers to a word, and in the context of GLONASS refers to a string. More specifically, a packet is a generic term meant to apply to one of GPS or GLONASS when mentioned explicitly, or otherwise applies to both GPS and GLONASS.

Figure 1:
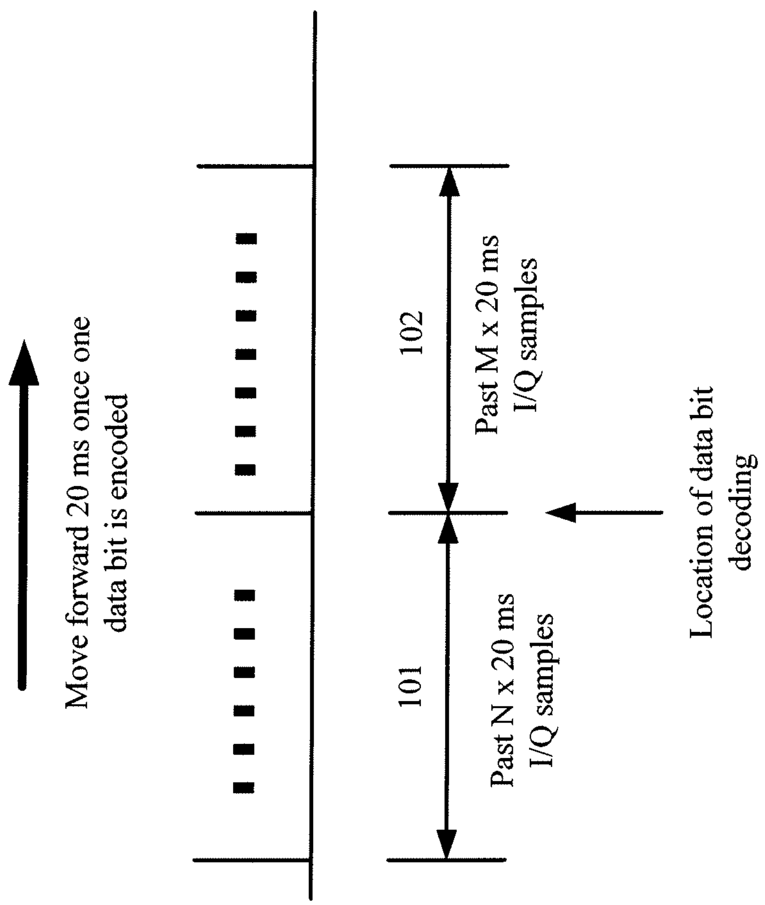
FIG. 1 illustrates an exemplary differential bit detection technique used for global positioning bit extraction.
Figure 2:
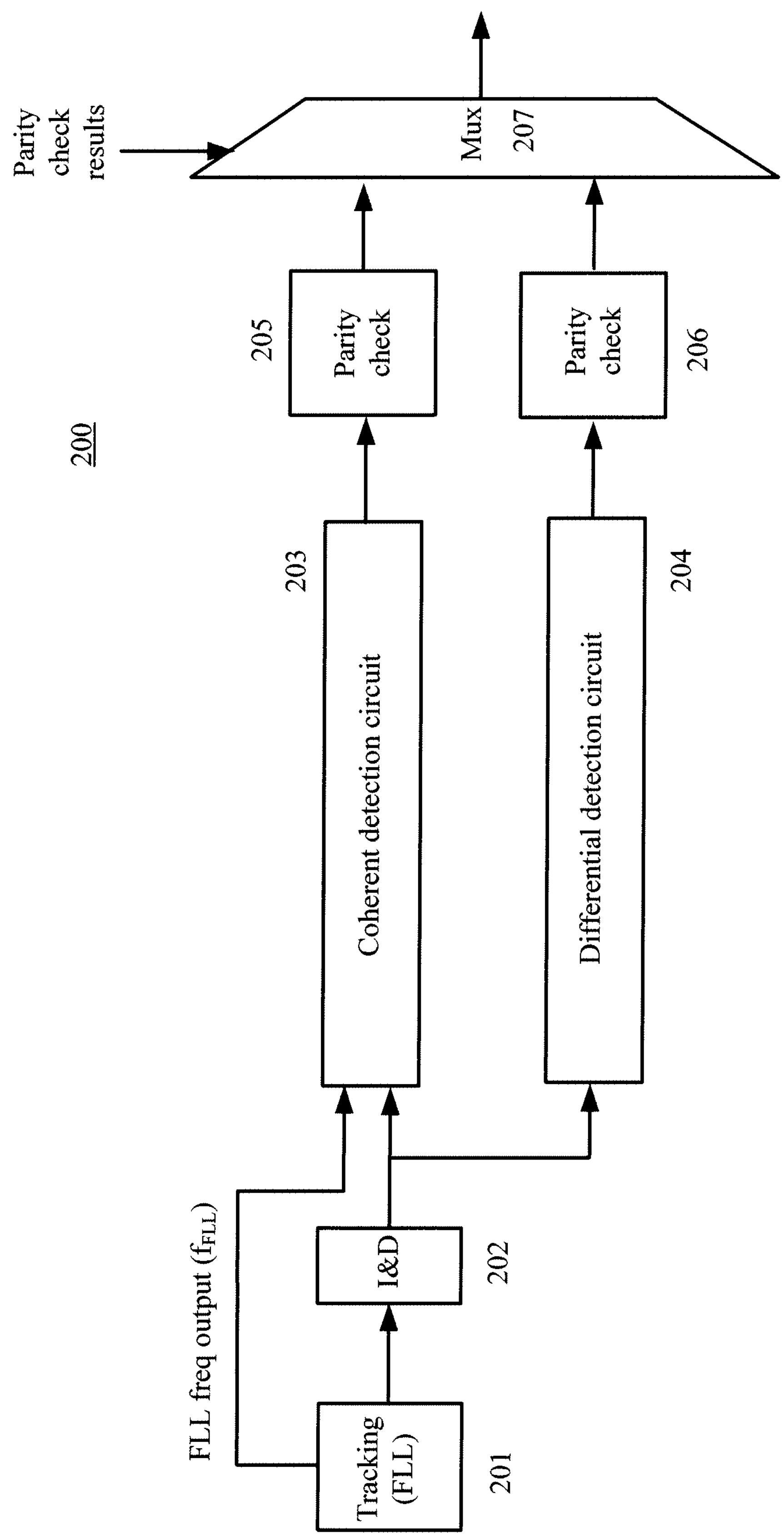
FIG. 2 illustrates an exemplary hybrid bit detection system that can be used for GPS and GLONASS bits.

FIG. 2 illustrates a block diagram of an exemplary hybrid GPS/GLONASS bit detection system 200. In this simplified block diagram, hybrid bit extraction system 200 includes a frequency lock loop (FLL) block 201 that can remove Doppler frequency error in received global positioning bits, an integrate and dump (I&D) block 202, a coherent detection circuit 203, a differential detection circuit 204, parity check blocks 205, 206, and a multiplexer (MUX) 207. In this embodiment, coherent detection circuit 203 can receive a frequency output $f_{FLL}$, which is generated by FLL 201. In contrast, differential detection circuit 204 can receive an output of I&D block 202, which can generate its output every 20 ms (upon receiving prompts every 1 ms from FLL 201 and integrating such signals). Parity check blocks 205 and 206 receive outputs of coherent detection block 203 and differential detection circuit 204, respectively. Multiplexer 207 selects between the outputs of parity check block 205 and parity check block 206 based on a parity check results signal.

Figure 3:
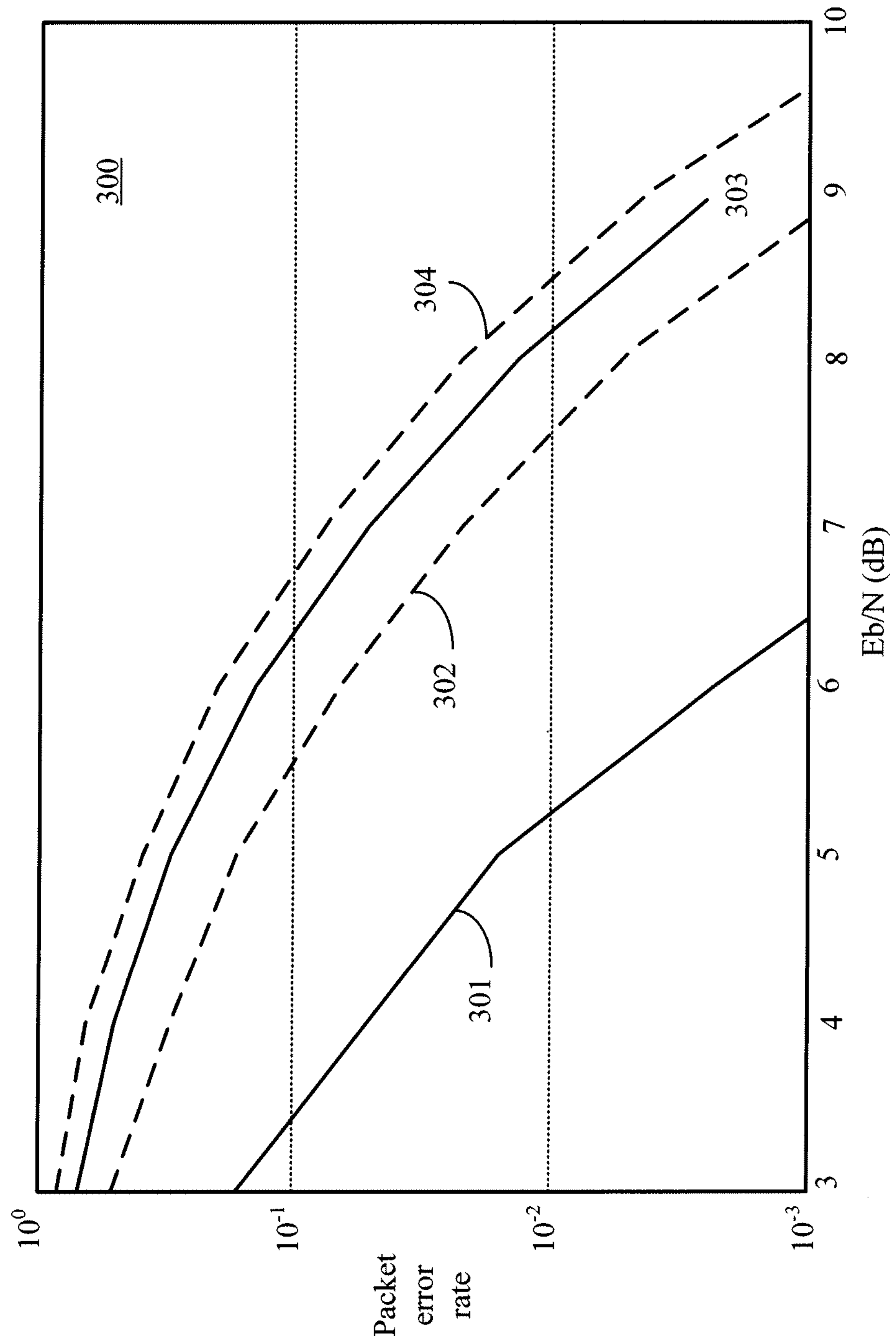
FIG. 3 illustrates a graph that shows one-bit error correcting gain for coherent and differential bit detection.

FIG. 3 illustrates a graph 300 that plots packet error rate versus gain (Eb/N, measured in dB). In graph 300, curve 301 represents the results of differential detection without one-bit frequency error correction (FEC); curve 302 represents the results of differential detection with FEC; curve 303 represents coherent detection without FEC; and curve 304 represent the results of coherent detection with FEC. Note that in graph 300, packets with zero frequency and phase error are used as a benchmark. As shown in FIG. 3, coherent detection is about 1 dB better than differential detection without one-bit error correction. With one-bit error correction, differential detection is improved by only 0.3 dB, but coherent detection is improved between 2.3 dB and 3 dB. Thus, the combination of differential detection and coherent detection (also called hybrid bit detection) can provide distinct advantages when designing a system that is robust against fluctuation of frequency error and noise.

Figure 4:
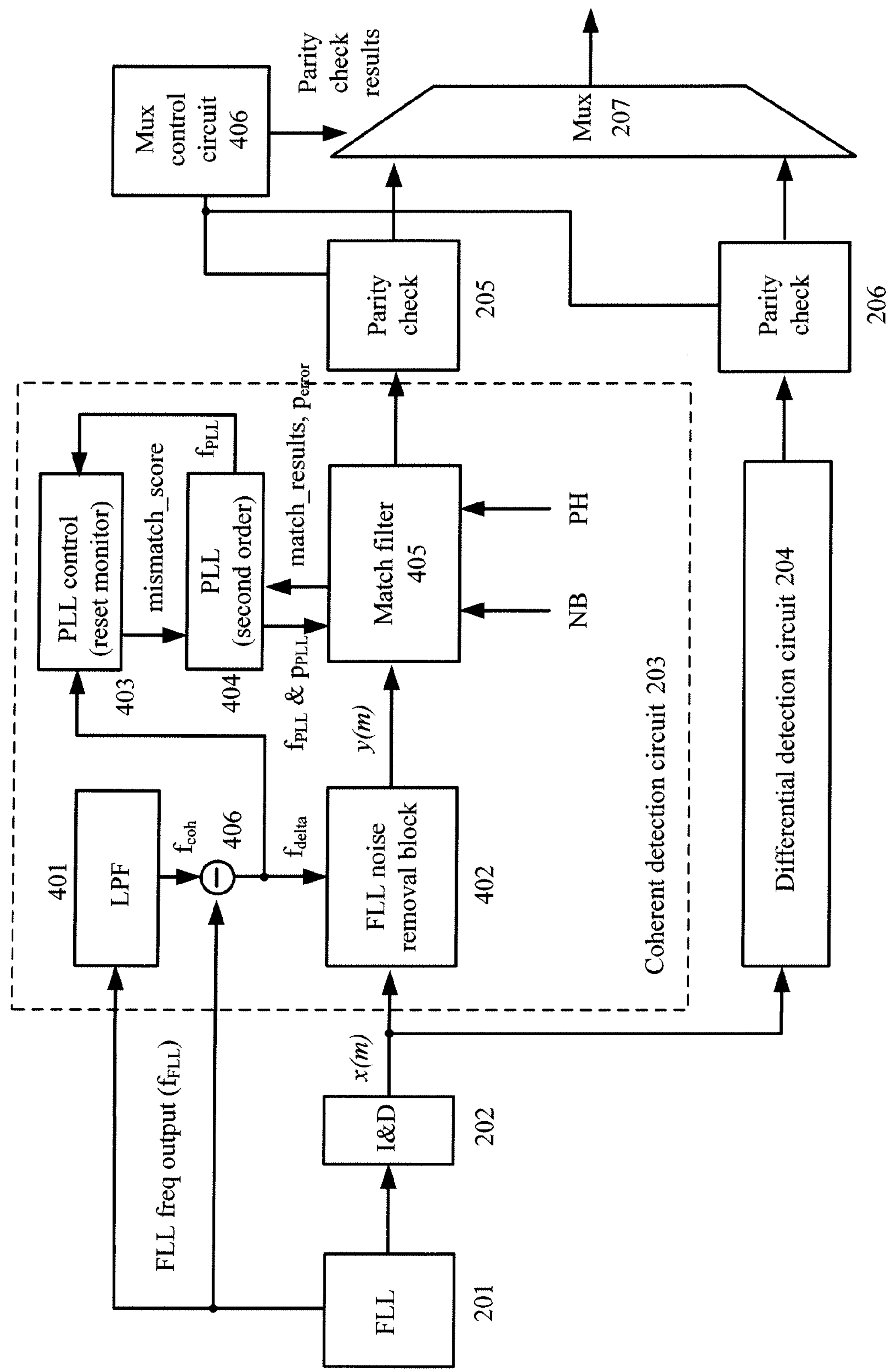
FIG. 4 illustrates a more detailed block diagram of a coherent detection circuit.

FIG. 4 illustrates a more detailed block diagram of coherent detection circuit 203 (FIG. 2). In this embodiment, coherent detection circuit 203 includes a low pass filter (LPF) 401, an FLL noise removal block 402, a phase lock loop (PLL) control block 403, a PLL (e.g. second order) 404, and a match filter 405.

The output frequency of FLL 201 is fed into LPF 401, which provides a one-pole IIR moving average function as follows:

$$\text{initialize: } f_{coh}(0)=f_{FLL}(0)$$

$$f_{coh}(m)=f_{coh}(m-1)x(1-\alpha)+f_{FLL}(m)x\alpha$$

where $f_{coh}(m)$ is LPF output at the $m^{th}$ bit and m is a 20 ms time index.

A subtractor 406 can be used to perform the function:

$$f_{delta}(m)=f_{coh}(m)-f_{FLL}(m)$$

where $f_{delta}(m)$ is the frequency offset that is needed to be removed at the $m^{th}$ bit and m is the 20 ms time index. In this manner, subtractor 406 can remove spikes from the frequency output while retaining the trend of that frequency output. Thus, LPF 401 and subtractor 406 can perform a smoothing function on $f_{FLL}$.

To remove frequency fluctuation caused by FLL 201, FLL noise removal block 402 can compute:

$$\theta_{delta}(m)=\sum_{i=i_0}^{m} f_{delta}(i)$$

as well as $y(m)=x(m)\cdot\exp(-jx\theta_{delta}(m))$ where $\theta_{delta}$ represents a phase change, x(m) is 20 ms of integrate and dump output of I&D 202, y(m) is an intermediate coherent detection output, and $\alpha$ is $2^{-4}$ for the training state (e.g. first 32 runs) and $2^{-7}$ for steady state.

Match filter 405, which processes windows of bits, can generate a bit value for parity check block 205 as well as match_results and phase error $p_{error}$ for PLL 404. To generate these values, match filter 405 can receive the intermediate coherent detection output y(m) as well as two, additional parameters. These parameters can include the number of bits (e.g. NB) and whether to use a phase array (e.g. PH=1 to use the phase array and PH=0 not to use the phase array). Note a larger NB can enhance a signal to noise ratio, but is countered by an increased risk of the frequency changing as the result of Doppler effects. The following example is for NB=3 (i.e. 3 bits of a sliding window: 3'b000, 3b'001, . . . 3b'111) and PH=1 (use phase array, which includes 3 levels $$[-\tfrac{\pi}{4} 0 \tfrac{\pi}{4}].$$

Computing match_results (i.e. the best pattern match determined by looking at the windows of bits) can be performed using the following:

$$z(m,n,k)=\sum_{i=1}^{NB} y(i+k-\lceil NB/2\rceil)\cdot BIT(m,i)\cdot \exp(-j\cdot\{2\pi\cdot T_{bit}\cdot f_{PLL}\cdot(i-\lceil NB/2\rceil)+\theta_{PLL}+PA(n)\})$$

where z(m, n, k) is the match_result of the $k^{th}$ bit for the $m^{th}$ bit array and $n^{th}$ phase array, i is the index of the bit within the window, $T_{bit}$ is the bit duration (e.g. 20 ms=20*1e-3), $f_{PLL}$ and $\theta_{PLL}$ are the estimation frequency and phase offset for PLL 404, respectively, ⌈.⌉ is the ceiling function (e.g. results are 2 and 3 for NB=3 and NB=5, respectively), PA is the phase array which is configured as $$[-\tfrac{\pi}{4} 0 \tfrac{\pi}{4}],$$

and BIT is the 2-dimensional bit matrix (the size being $2^{NB}\times$ NB). For NB=3, $$BIT=\begin{bmatrix} B_{4\times3} \\ -B_{4\times3} \end{bmatrix}$$

where $$B_{4\times3}=\begin{bmatrix} 1 & 1 & 1 \\ 1 & 1 & -1 \\ 1 & -1 & 1 \\ 1 & -1 & -1 \end{bmatrix}$$

Note that the different signs of the bit combination (e.g. 111 and −1−1−1) will have same |real(z)|. Thus, only the first half of the bit combinations needs to be searched.

Values that maximize real{z(m, n, k)}|m=1~$2^{NB}$; n=1~3, i.e. $m_{max}$ and $n_{max}$, can be found. At this point, the outputs for match filter 205 are: the $n^{th}$ decoded bit=BIT($m_{max}$, ⌈NB/2⌉) to parity check block 205, and the match_results, i.e. complex z($m_{max}$, $n_{max}$, k), and $p_{error}$=PA($n_{max}$) to PLL 404.

Note that a setting of NB=3 and PH=1 (3 phases) has 24 combinations. To reduce the 24 combinations to 12, the following computation can be performed:

$$z'(m,n,k)=\sum_{i=1}^{NB} y(i+k-\lceil NB/2\rceil)\cdot B_{4\times3}(m,i)\cdot \exp(-j\cdot\{2\pi\cdot T_{bit}\cdot f_{PLL}\cdot(i-\lceil NB/2\rceil)+\theta_{PLL}+PA(n)\})$$

Figure 5:
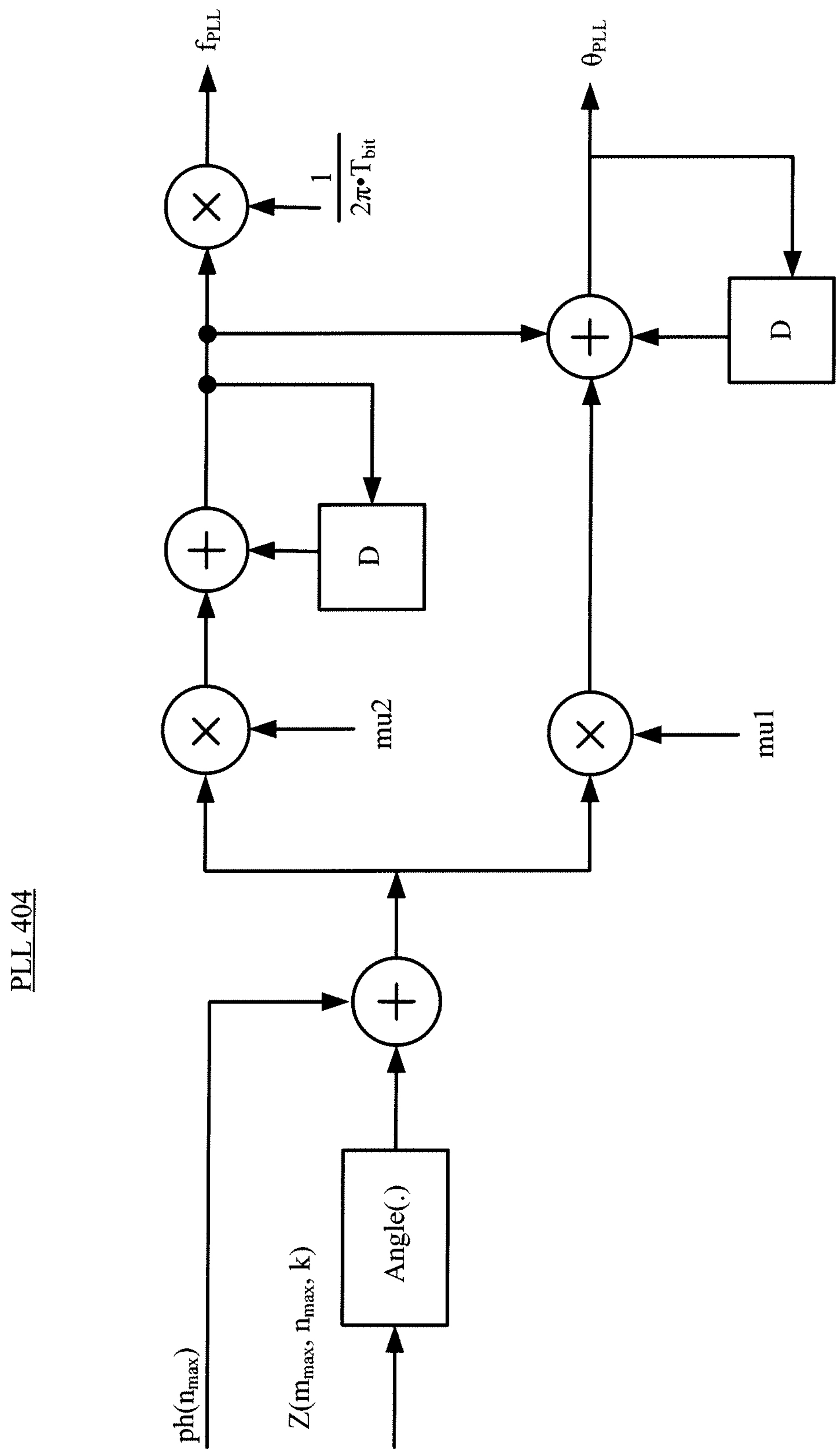
FIG. 5 illustrates an exemplary phase-locked loop (PLL).

After finding $m_{max}$ and $n_{max}$ that maximize |real{z'(m, n, k)}|m=1~$2^{NB-1}$; n=1~3, then if real{z'($m_{max}$, $n_{max}$, k)}≥0
  z($m_{max}$, $n_{max}$, k)=z'($m_{max}$, $n_{max}$, k)
  decoded bit=$B_{4\times3}$($m_{max}$, ⌈NB/2⌉)
else
  z($m_{max}$, $n_{max}$, k)=z'($m_{max}$, $n_{max}$, k)
  decoded bit=−$B_{4\times3}$($m_{max}$, ⌈NB/2⌉)
end An exemplary embodiment for implementing PLL 404 is shown in FIG. 5. PLL 404 operates as shown in the following equations.

$$\text{phase\_error} = \text{angle}\{z(m_{max}, n_{max}, k)\} + PA(n_{max})$$

$$f_{PLL} = f_{PLL} + \frac{mu2}{2\pi \cdot T_{bit}} \cdot \text{phase\_error}$$

$$\theta_{PLL} = \theta_{PLL} + mu1 \cdot \text{phase\_error} + f_{PLL} \cdot 2\pi \cdot T_{bit}$$

As shown in FIG. 5, the step sizes for PLL 404 are mu1 and mu2. Note that initially, an enabled phase offset estimation may be sufficient to stabilize PLL 404. In one embodiment, if the loop count is less than a predetermined number, e.g. 8 of the first 32 runs (20 ms for each loop update), then mu1=¼ and mu2=0. Otherwise, mu1=¼ and mu2=1/16.

In one alternative embodiment, the input to PLL 404 can be derived without a phase array, which reduces the number of combinations to 4 for NB=3. In such an embodiment, the following computation ca be performed:

$$z'(m, n, k) = \sum_{i=1}^{NB} y(i + k - \lceil NB/2 \rceil) \cdot B_{4\times 3}(m, i) \cdot \exp(-j \cdot \{2\pi \cdot T_{bit} \cdot f_{PLL} \cdot (i - \lceil NB/2 \rceil) + \theta_{PLL}\})$$

The best bit pattern can then be found by computing:

$$\max\{|z'(m,k)||m=1\sim 2^{NB-1}\}$$

wherein $m_{max}$ is obtained for the $k^{th}$ decision bit.

The +/− ambiguity can be resolved and the input to PLL 404 can be generated as follows:

if real{z'($m_{max}$, k)}≥0
  z($m_{max}$, k)=z'($m_{max}$, k)
  decoded bit=⌈NB/2⌉)
else
  z($m_{max}$, k)=z'($m_{max}$, k)
  decoded bit=−$B_{4\times3}$($m_{max}$, ⌈NB/2⌉)
end
  PLL input $p_{error}$=angle {z($m_{max}$, k)}

Note that phase detection without using a phase array is similar to the PH=1 method in that it reduces the number of comparisons, but instead the magnitude (or power) is computed. Therefore, computational resources may be substantially similar.

In a typical embodiment, PLL 404 may have a small frequency pull-in range, e.g. around 5 Hz or less. To determine whether PLL 404 should be reset, two inputs can be used. Specifically, PLL control block 403 can receive $f_{delta}$ and $f_{PLL}$ to compute a bit frequency error $f_{error}$(i) as follows:

$$f_{error}(i) = \left| \frac{1}{M} \sum_{m=(i-1)*M+1}^{i*M} (f_{PLL}(m) - f_{delta}(m)) \right|$$

if ($f_{error}$(i)≥threshold1)
  mismatch_score=mismatch_score+1
else
  mismatch_score=0
end
if (mismatch_score≥threshold2)
  reset PLL
end where, for example, M=32, theshold1=7 (Hz), and threshold2=4 (continuous four times check failed).

Figure 6:
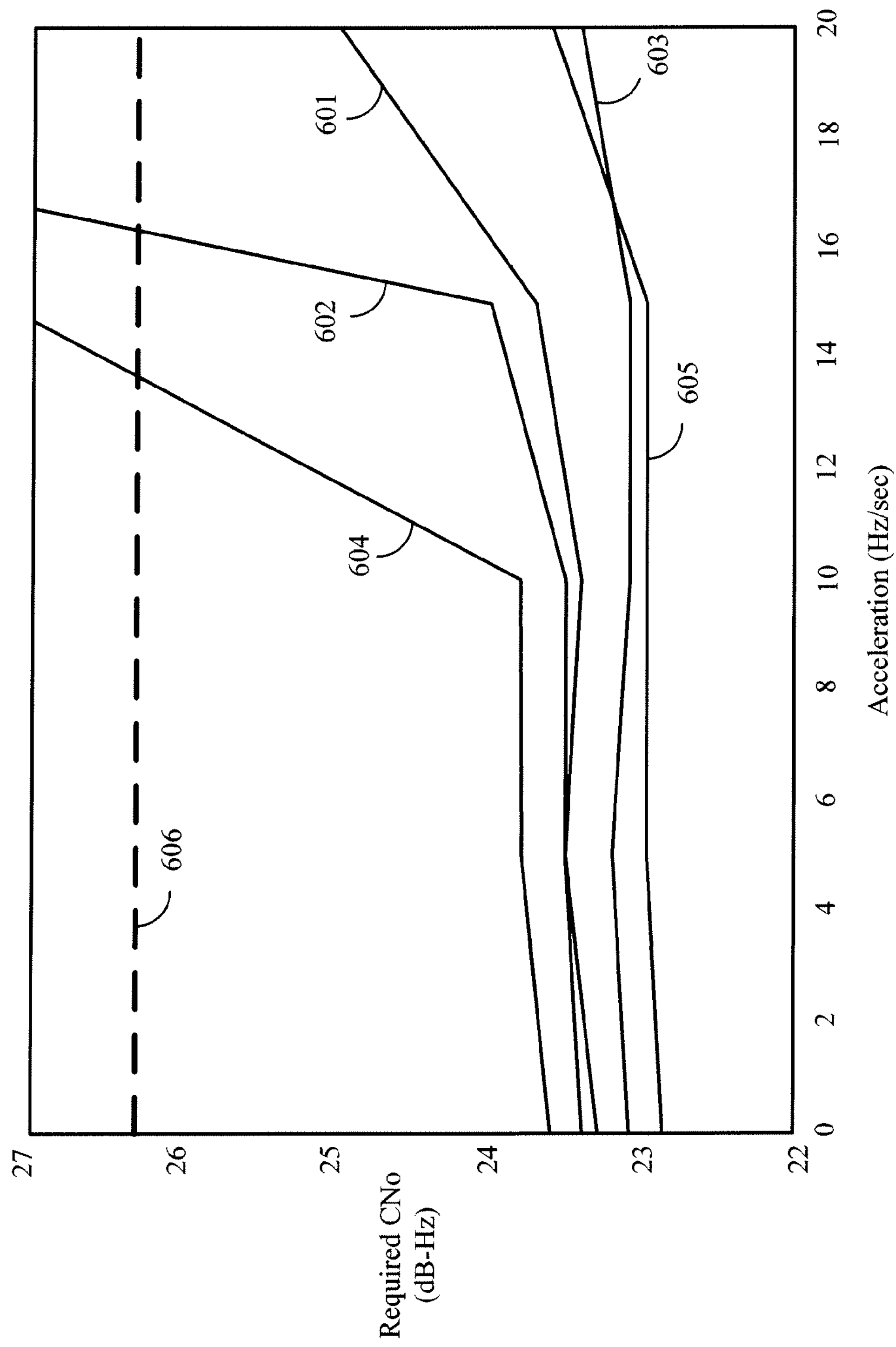
FIG. 6 illustrates the results of coherent bit detection using combinations of different numbers of bits and with/without a phase array.

FIG. 6 illustrates the results of coherent bit detection using different NB and PH sets. Assume the following parameters: for the FLL frequency fluctuation removal α=($2^{-4}$, $2^{-7}$), for the PLL control block M=32, threshold1=7, and threshold2=4, mu1=¼, and mu2=1/16. Curve 601 represents the results of NB=1, PH=0; curve 602 represents the results of NB=3, PH=0; curve 603 represents the results of NB=3, PH=1; curve 604 represents the results of NB=5; PH=0; and curve 605 represents the results of NB=5, PH=1. Note that the results for differential bit extraction are represented by curve 606.

As discerned from FIG. 6, the larger the NB, the lower the required C/No, but the worse the tolerance to dynamics. Moreover, enabling the phase array for the match filter (i.e. PH=1) increases the PLL pull-in range. The results associated with curve 603, i.e. NB=3 and PH=1 (3-bit array with 3 levels {−π/4, 0, π/4} demonstrate optimized coherent detection. Moreover, this NB/PH set can provide about 3 dB better performance than differential detection with error correction (curve 606).

In one embodiment, the parity check operation performed by parity check blocks 205 and 206 can detect bit errors of three or fewer and any odd number of bit errors. Table 1 below shows the word false alarm rate, i.e. the probability of a word with bit errors passing the parity check, for a GPS word.

TABLE 1

False alarm rate for GPS parity check

| | # of bit errors | | | | | | | | | | |
|---|---|---|---|---|---|---|---|---|---|---|---|
| | 0 | 1 | 2 | 3 | 4 | 5 | 6 | 7 | 8 | 9 | 10 |
| False alarm rate | 0 | 0 | 0 | 0 | 3.46e−2 | 0 | 3.06e−2 | 0 | 3.12e−2 | 0 | 3.08e−2 |

As shown in Table 1, the false alarm rate for even number of bit errors is quite large. Therefore, in one embodiment, the GML (GLASS Measurement Layer software) can utilize additional verification to reduce the parity check false alarm rate. This additional verification can include two techniques. In a first technique, all 10 words in a sub-frame can be required to pass parity. That is, a false alarm probability may be high for a single word at low SNR with large number of bit errors, but in that case it is unlikely to pass ten continuous parity checks.

In a second technique, one or more selected data fields can be verified in each sub-frame. For example, in one embodiment, a fixed 8-bit synchronization pattern in the TLM (telemetry) word (which is the first GPS word) can be verified. In this case, if the 8-bit synchronization pattern is inversed, then all of the sub-frame bits can be flipped. In another example, 17-bits of TOW (time of week) and 3-bits of SID (sub-frame identification), both in the HOW (handover word) (which is the second GPS word), can also (or alternatively) be verified. In yet another example, the last two GPS parity check bits (called in the industry D29 and D30) should be zeros for the second and last words (per standard rules of parity checking) and therefore can also be checked. Note that flipping all the sub-frame bits and making the last two parity check bits zeros for the second and last words can be useful for detecting an odd number of phase inversions within one sub-frame.

In a third technique, the number of corrected words in each sub-frame can be limited. For example, if the number of bit corrected words is greater than 2 for the sub-frame, then the sub-frame is discarded.

Because the parity check is useful for detecting bit errors of two or less, flipping the bit pattern may result in passing of the parity check, thereby improving performance. In one embodiment, a bit flipping technique (also called advanced detection herein) applicable to differential detection can include checking whether bit [0:29](i.e. all 30 bits) passed the parity check. If not, then bit [n:29](where n is 0 to 29) can be flipped and re-checked to see if it passes the parity check. In other words, bit n and all subsequent bits of that word are flipped. A flipping technique applicable to coherent detection can include checking whether bit [0:29] passed the parity check. If not, then bit [n](where n is 0 to 29) can be flipped and re-checked to see if it passes the parity check. In other words, only bit n is flipped, followed by the parity check.

In contrast, basic differential detection techniques merely check to see whether bit [0:29] or ~bit[0:29](i.e. all 30 bits inverted) passed the parity check. Similarly, basic coherent detection techniques merely check to see whether bit [0:29] passed the parity check. FIGS. 7-10 illustrate exemplary, simulated GPS detection results that compare basic and advanced coherent/differential techniques. These simulations were performed assuming an acceleration of 10 Hz/sec, a pre-detection interval of 10 ms in the FLL, and 10,000 runs. Additionally, the parameters for the PLL are assumed to be NB=3, PH=1, mu1=¼, mu2=1/16, and $\alpha=2^{-7}$.

Figure 7:
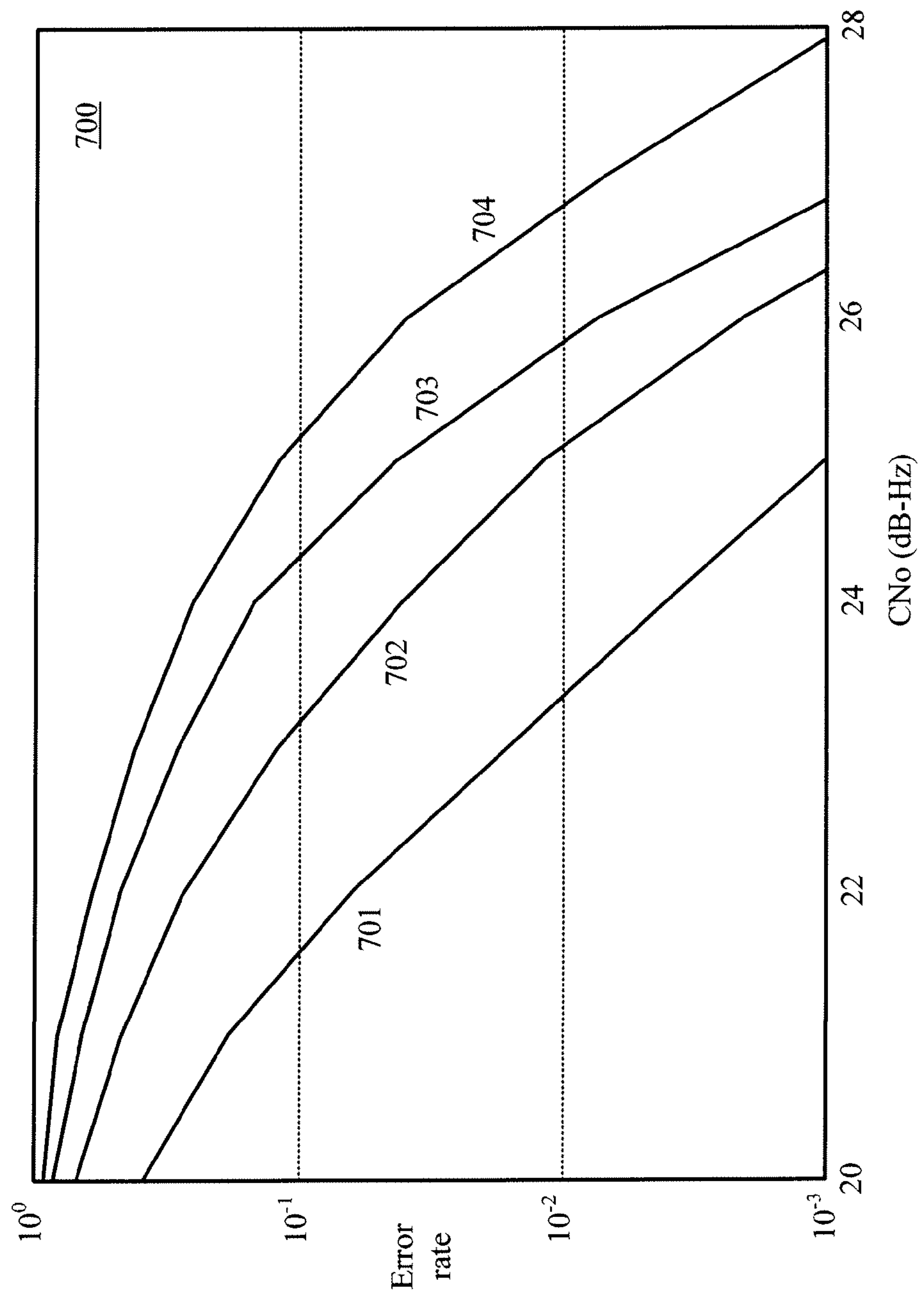
FIGS. 7-10 illustrate exemplary, simulated GPS detection results that compare basic and advanced, coherent and differential techniques.
Figure 8:
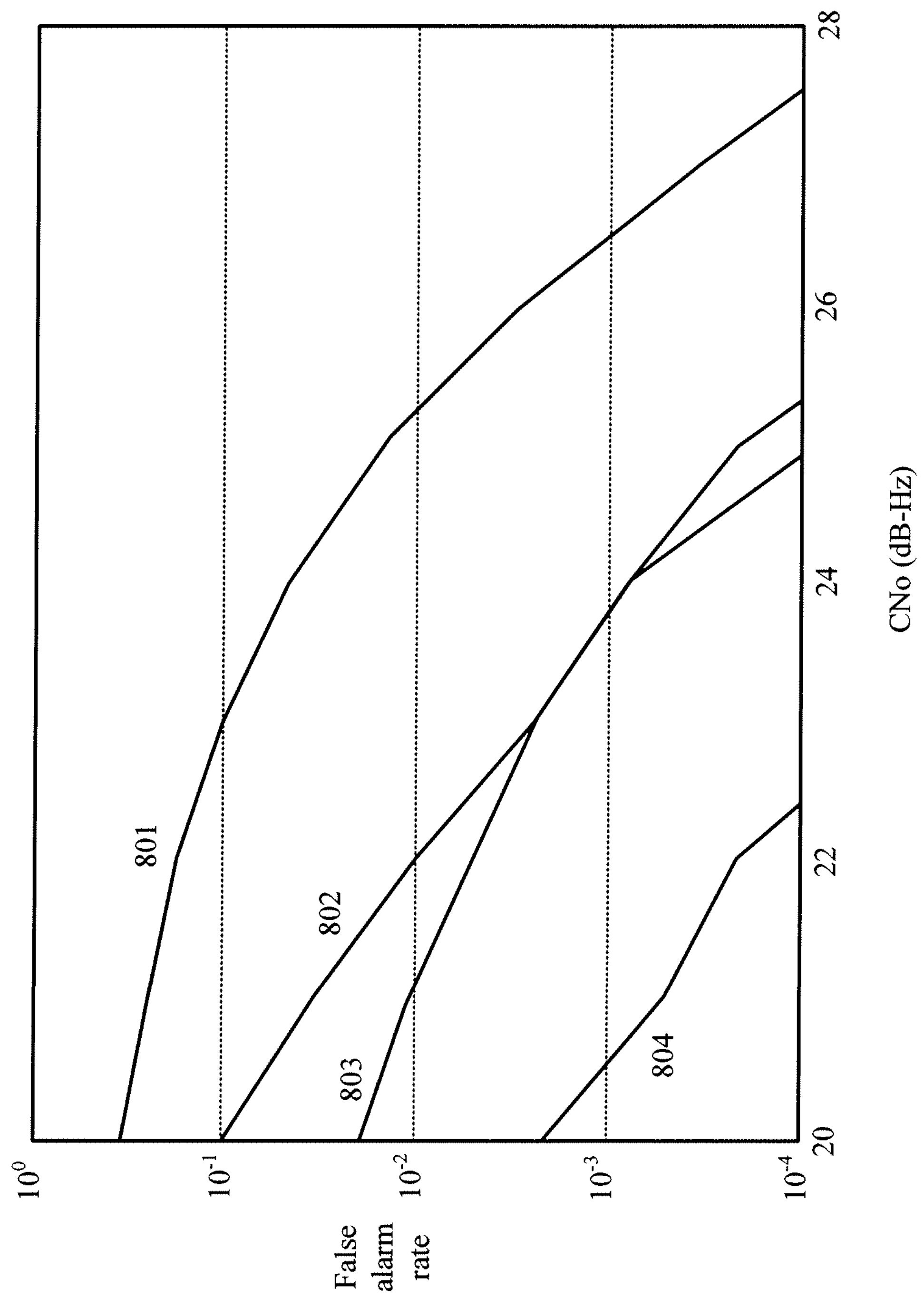

FIG. 7 illustrates the results of four detection techniques based on a packet (i.e. GPS word in this case) using a graph 700 plotting error rate versus signal to noise (CNo). Curve 701 represents the results of advanced coherent detection; curve 702 represents the results of basic coherent detection; curve 703 represents the results of advanced differential detection; and curve 704 represents the results of basic differential detection. FIG. 8 illustrates the results of the same four detection techniques for a GPS word using a graph 800 plotting false alarm rate versus CNo. In graph 800, curve 801 represents the results of advanced differential detection; curve 802 represents the results of advanced coherent detection; curve 803 represents the results of basic differential detection; and curve 804 represents the results of basic coherent detection. As shown in FIG. 8, the packet false alarm rate is high for almost all methods. Therefore in one embodiment, data can be qualified on a sub-frame basis instead of on a word basis to reduce the false alarm rate, albeit with a slightly lower sub-frame success rate.

Figure 9:
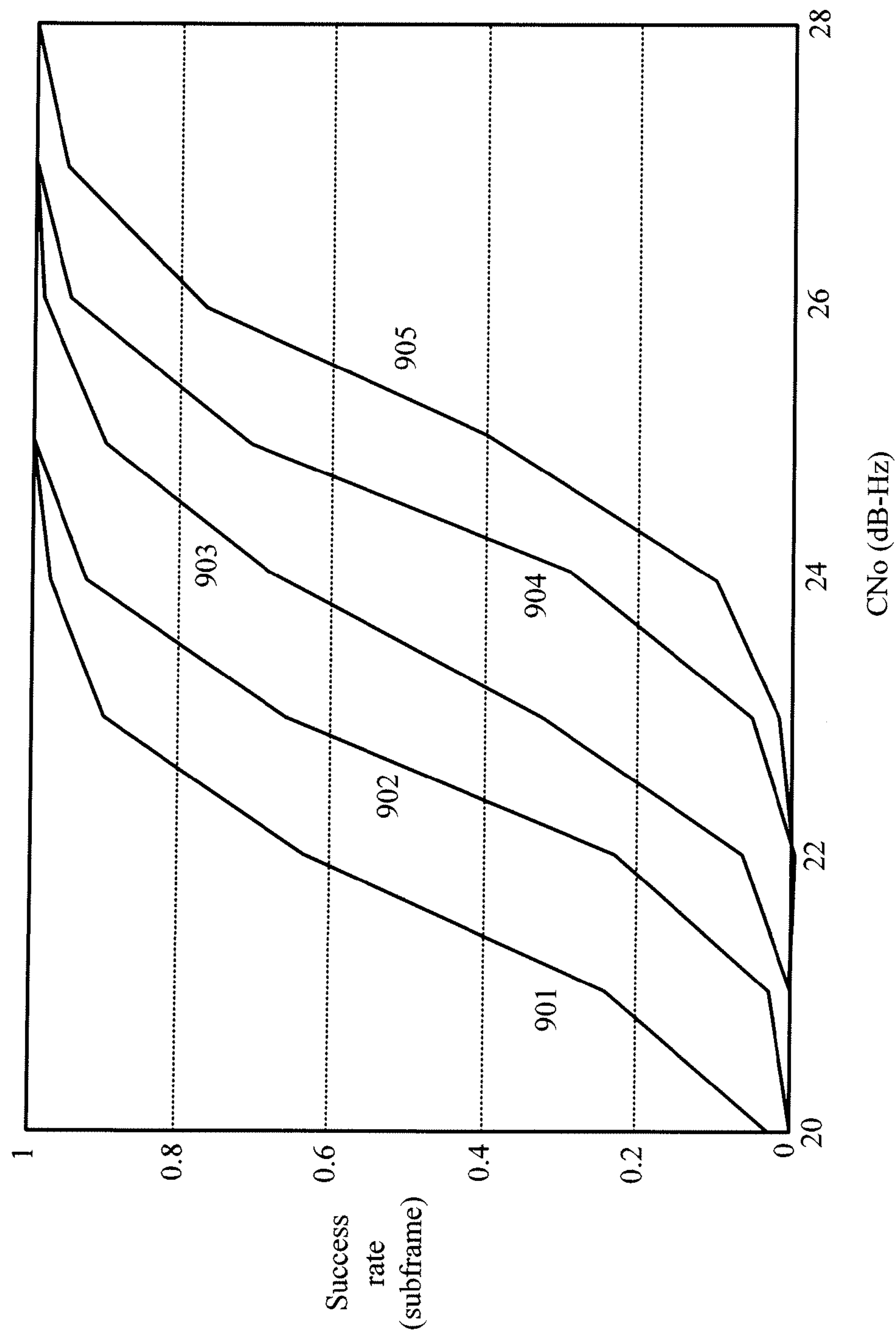

FIG. 9 illustrates the results of the five detection techniques for GPS sub-frames using a graph 900 plotting false alarm rate versus CNo. In graph 900, curve 901 represents the results of advanced coherent detection that allows up to 10 corrected words in each sub-frame (because there are a total of 10 words in each sub-frame, this means there is no constraint on the number of corrections); curve 902 represents the results of advanced coherent detection that allows up to 2 corrected words in each sub-frame; curve 903 represents the results of basic coherent detection; curve 904 represents the results of advanced differential detection; and curve 905 represents the results of basic differential detection.

Figure 10:
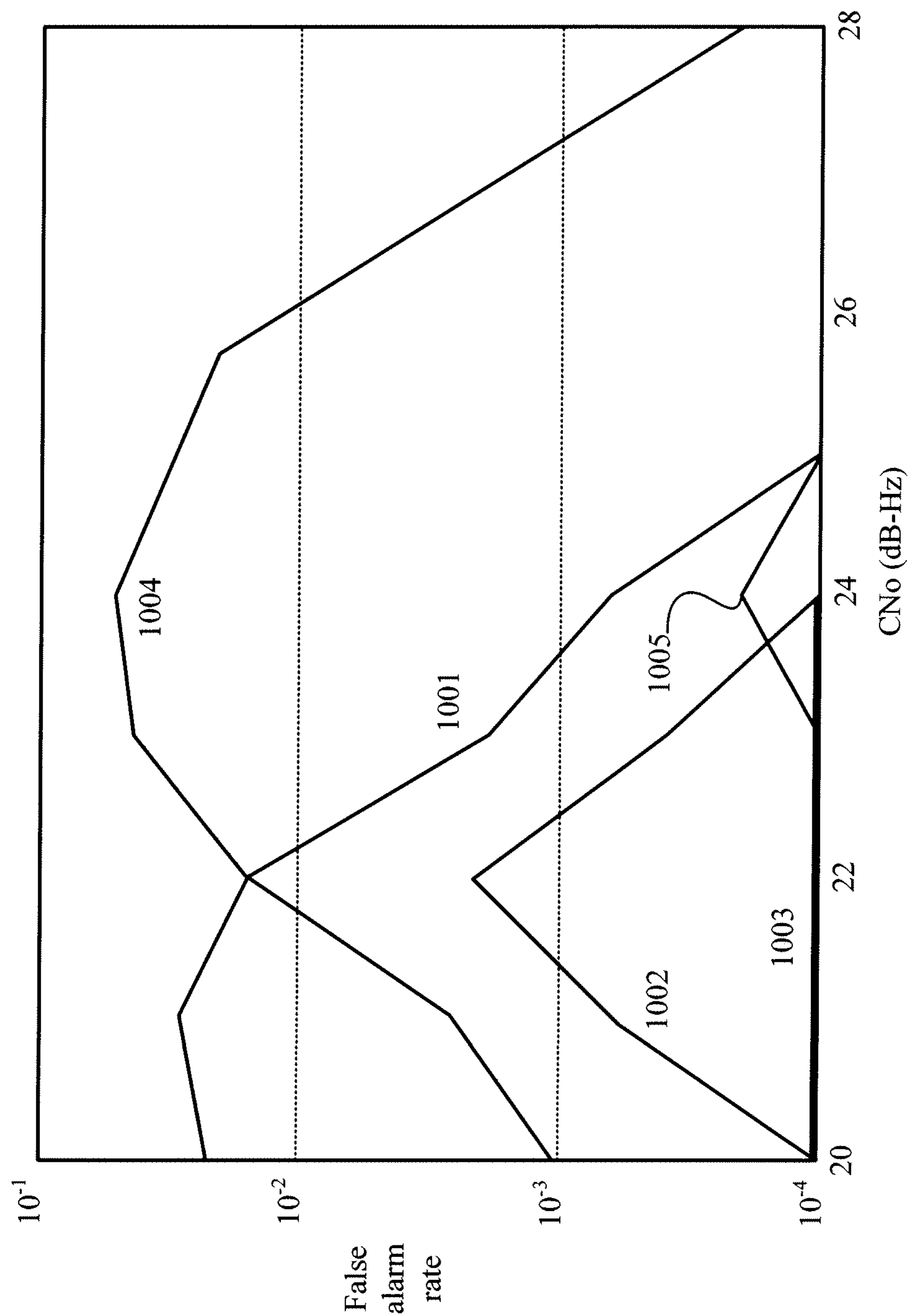

FIG. 10 illustrates the results of the five detection techniques for GPS sub-frames using a graph 1000 plotting false alarm rate versus CNo. In graph 1000, curve 1001 represents the results of advanced coherent detection that allows up to 10 corrected words in each sub-frame; curve 1002 represents the results of advanced coherent detection that allows up to 2 corrected words in each sub-frame; curve 1003 represents the results of basic coherent detection; curve 1004 represents the results of advanced differential detection; and curve 1005 represents the results of basic differential detection. As shown by FIG. 10, advanced differential detection provides false alarm rate is high, whereas basic coherent detection provides a false alarm rate of almost zero.

Advanced coherent detection that allows up to 10 corrected words per sub-frame can improve the success rate by 3.6 dB compared to basic differential detection (FIG. 9), but has a high false alarm rate (FIG. 10). In contrast, coherent detection that allows up to 2 corrected words per sub-frame (wherein if the number of corrected words is larger than 2, then the sub-frame is discarded) can degrade the success rate from 3.6 dB to 2.8 dB, but can reduce the maximum false alarm rate from 3e-2 to 2e-3.

Table 2 summarizes the performance results shown in FIGS. 9 and 10.

TABLE 2

Performance comparison for coherent and differential detection (the required C/No for 90% sub-frame success rate)

| Method | CNo (dB-Hz) | False alarm rate (Maximum) | Improvement (dB) |
|---|---|---|---|
| Differential-basic | 26.7 | 2e−4 | 0 |
| Differential-advanced | 25.8 | 5e−2 | 0.9 |
| Coherent-basic | 25.0 | 0 | 1.7 |
| Coherent-advanced (2) | 23.9 | 2e−3 | 2.8 |
| Coherent-advanced (10) | 23.1 | 3e−2 | 3.6 |

Optimally, the best output from either differential or coherent detection should be used. In other words, if only one technique decodes the sub-frame successfully, then that detection result should be used. In one embodiment, if both techniques decode the sub-frame successfully, then the detection technique with the lower false alarm rate should be used. Referring back to FIG. 4, a multiplexer control circuit 406 can make these determinations. Based on the above results, the order of preference for GPS can be ordered as follows: Coherent-basic, Differential-basic, and Coherent-advanced (allowing up to 2 words per sub-frame to be corrected).

Figure 11:
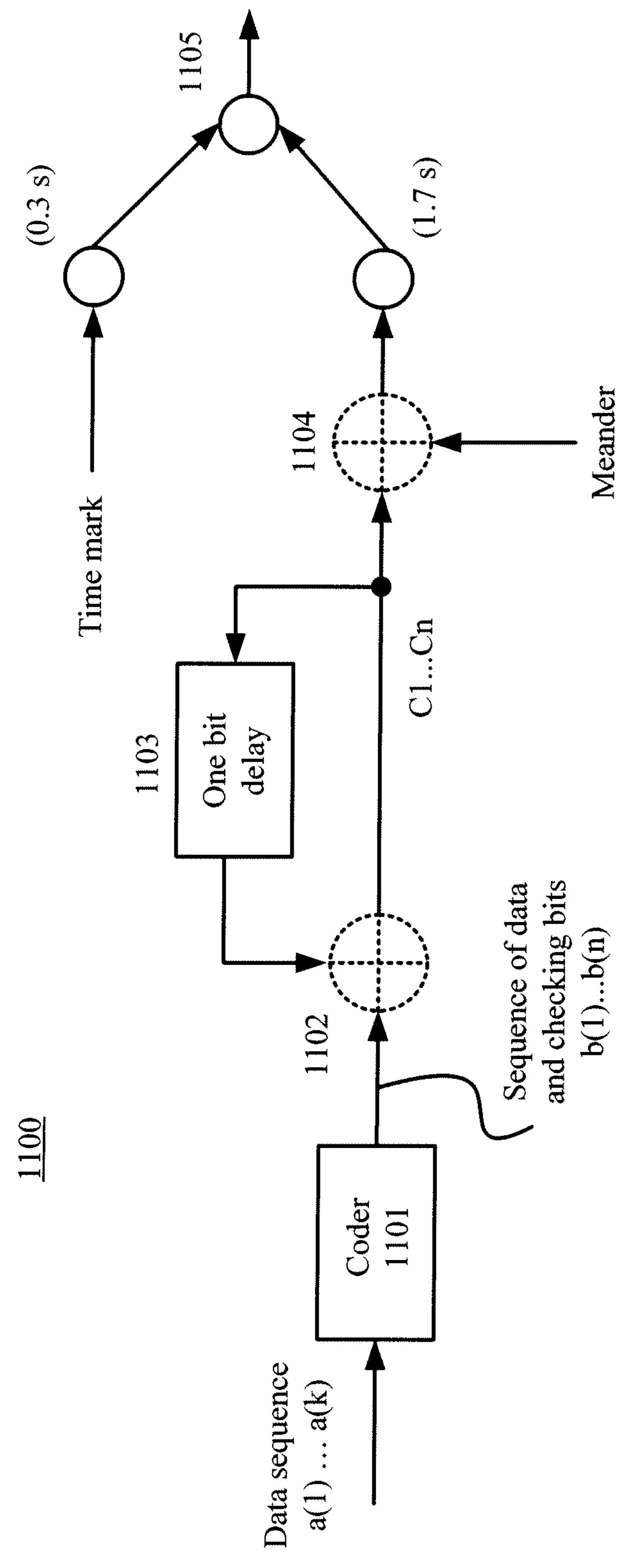
FIG. 11 illustrates an exemplary GLONASS navigation message generation system.

The hybrid bit extraction technique described above can apply equally to GPS and GLONASS packets. FIG. 11 illustrates an exemplary GLONASS navigation message generation system 1100 including a coder 1101 and differential encoding components including modulo-2 addition circuits 1102, 1104 and a one-bit delay component 1103. Specifically, modulo-2 addition circuit adds the sequence of data and checking bits b(1) . . . b(n) output by coder 1101 and the output of the one bit delay circuit 1103. The output of modulo-2 addition circuit 1102 C1 . . . CN is provided to the input of one bit delay circuit 1103 and modulo-2 addition component 1104. Modulo-2 addition component 1104 adds C1 . . . CN to a meander sequence occurring every 10 ms. The output of modulo-2 addition component 1104 generates the above-described 1.7 s of GLONASS navigation information. A transmitter 1105 can output one of the GLONASS navigation information or the 0.3 s of time mark information.

Coder 1101 allows detecting a limited number of bit errors within a string consisting of a(1) . . . a(k). Each string includes 85 data bits where the most significant bit is an idle bit (0), the next 76 most significant bits are data bits, and the 8 least significant bits are parity check bits. Therefore, a parity check can correct 1-bit errors, and detect 2 or odd number of bit errors within the string.

Table 3 indicates the probability of falsely passing parity check for different numbers of bit errors. The parity check can detect bit errors of three or less and any odd number of bit errors within the string (i.e. false alarm rate=0). Although coder 1101 can correct a one-bit error within the string, the false alarm rate is quite large (>0.6) for a three-bit error (or more-odd-number-of-bits error). For example, 69.8% of the strings with 3-bit errors will pass the parity check after applying 1-bit error correction. Therefore, one-bit correction is not useful for the GLONASS data detection because of the high false alarm rate.

TABLE 3

False alarm rate for the GLONASS coder

| | # of bit errors | | | | | | | | | | |
|---|---|---|---|---|---|---|---|---|---|---|---|
| | 0 | 1 | 2 | 3 | 4 | 5 | 6 | 7 | 8 | 9 | 10 |
| False alarm rate for parity check | 0 | 0 | 0 | 0 | 8.7e−3 | 0 | 7.8e−3 | 0 | 7.8e−3 | 0 | 7.8e−3 |
| False alarm rate for 1 bit-correct | 0 | 0 | 0 | 0.698 | 8.7e−3 | 0.666 | 7.8e−3 | 0.658 | 7.8e−3 | 0.656 | 7.8e−3 |

Unlike GPS and as described above, GLONASS adopts differential encoding for the navigation message. Thus, using differential bit detection, one phase error in the GLONASS packet will only result in a 1-bit error at the end. However, using coherent bit detection, one phase error will cause two bits error at the end, and two phase errors will cause four bits error at the end, which raises the false alarm rate of parity check (e.g. to 8.7 e-3).

Therefore, in GLONASS, the following techniques can be used to reduce the false alarm rate. In a first technique, a sub-frame (e.g. consisting of 5 strings) can be used to check parity instead of using one string. Note that each frame of GLO has 15 strings (string IDs being 1 to 15) and the first five strings are occupied by the ephemeris.

In a second technique to reduce the false alarm rate, specific bits can be verified for each sub-frame. In one embodiment, the 4-bits of the string ID can be checked to ensure they increment properly. If the IDs do not increment properly, then the sub-frame can be discarded. Note that this condition can be ignored if it is deemed to be a minor factor.

In a third technique, the number of corrected strings can be limited. For example, if the number of bit-corrected strings is greater than one for the sub-frame, then that sub-frame can be discarded.

In one embodiment, the bit pattern can also be flipped in an attempt to pass the parity check. For example, for both differential and coherent detection, with basic parity check, bit[0:84](i.e. all 85 bits) can be checked to determine whether they passes the parity check. With advanced parity check for differential detection, bit[0:84] can be checked to determine whether it passes the parity check and, if not, then bit[n:n+1] (where n is 1 to 84) can be flipped to see if it passes the parity check. Note bit[0] is always 0 and should not be altered. In contrast, for coherent detection, with basic parity check, with advanced parity check, bit[0:84] can be checked to determine whether it passes the parity check and, if not, then bit[n:n+1] (where n is 1 to 83) (i.e. two bits) can be flipped to see if it passes the parity check. Note that two consecutive bits are flipped because GLONASS is differentially encoded and thus coherent detection may cause a two-bit error.

FIGS. 12-15 illustrate exemplary, simulated GLONASS detection results that compare flipping techniques to non-flipping techniques. These simulations were performed assuming an acceleration of 10 Hz/sec, a pre-detection interval of 10 ms in the FLL, and 10,000 runs. Additionally, the parameters for the PLL are assumed to be NB=3, PH=1, mu1=¼, mu2=1⁄16, and $\alpha=2^{-7}$.

Figure 12:
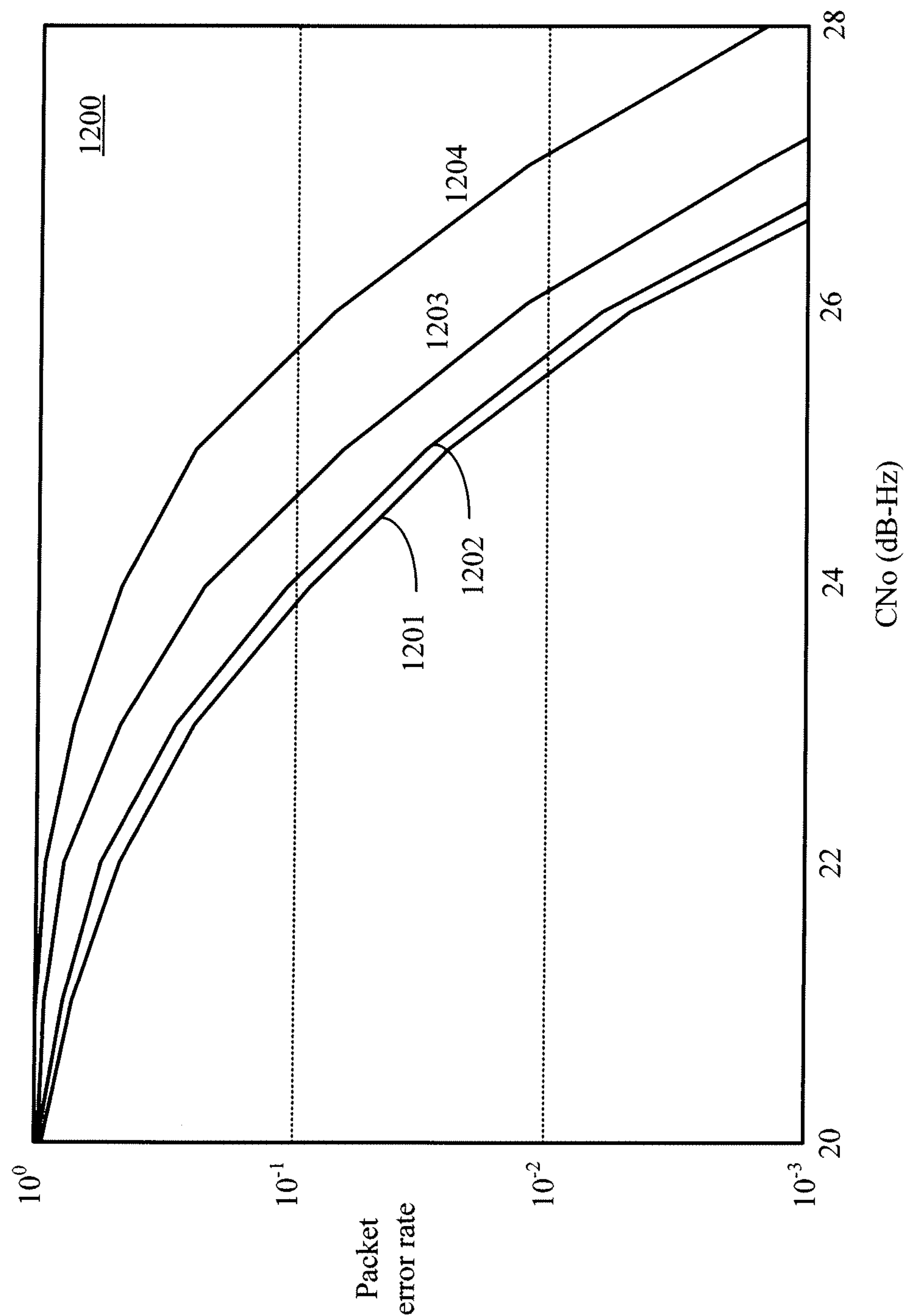
FIGS. 12-15 illustrate exemplary, simulated GPS detection results that compare basic and advanced, coherent and differential techniques.
Figure 13:
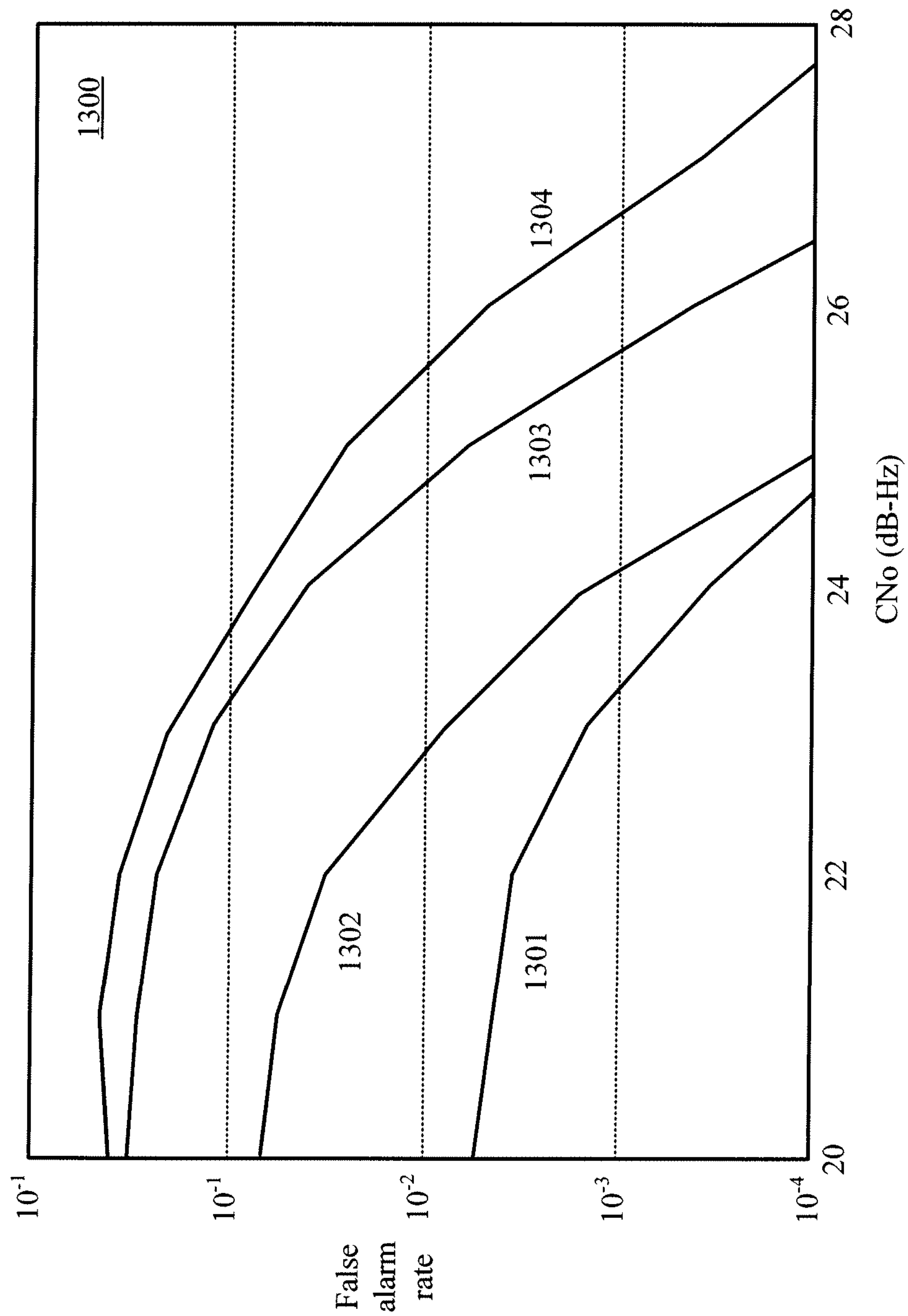

FIG. 12 illustrates the results of four detection techniques based on a packet, i.e. a GLONASS string in this case, using a graph 1200 plotting packet error rate versus signal to noise (CNo). Curve 1201 represents the results of advanced (i.e. bit flipping) coherent detection; curve 1202 represents the results of basic coherent detection; curve 1203 represents the results of advanced differential detection; and curve 1204 represents the results of basic differential detection. FIG. 13 illustrates the results of the same four detection techniques for a GLONASS string using a graph 1300 plotting false alarm rate versus CNo. In graph 1300, curve 1301 represents the results of basic differential detection; curve 1302 represents the results of basic coherent detection; curve 1303 represents the results of advanced differential detection; and curve 1304 represents the results of advanced coherent detection.

As shown in FIGS. 12 and 13, the advanced parity check for coherent detection improves by only 0.15 dB over no error correction (i.e. basic parity check), but suffers from an undesirable high false alarm rate. The little gain and significant downside is because flipping two consecutive bits can easily cause false parity check pass for GLONASS. Therefore, in one embodiment, a two-bit error correction for coherent detection is not considered with respect to FIGS. 14 and 15 (described below).

Figure 14:
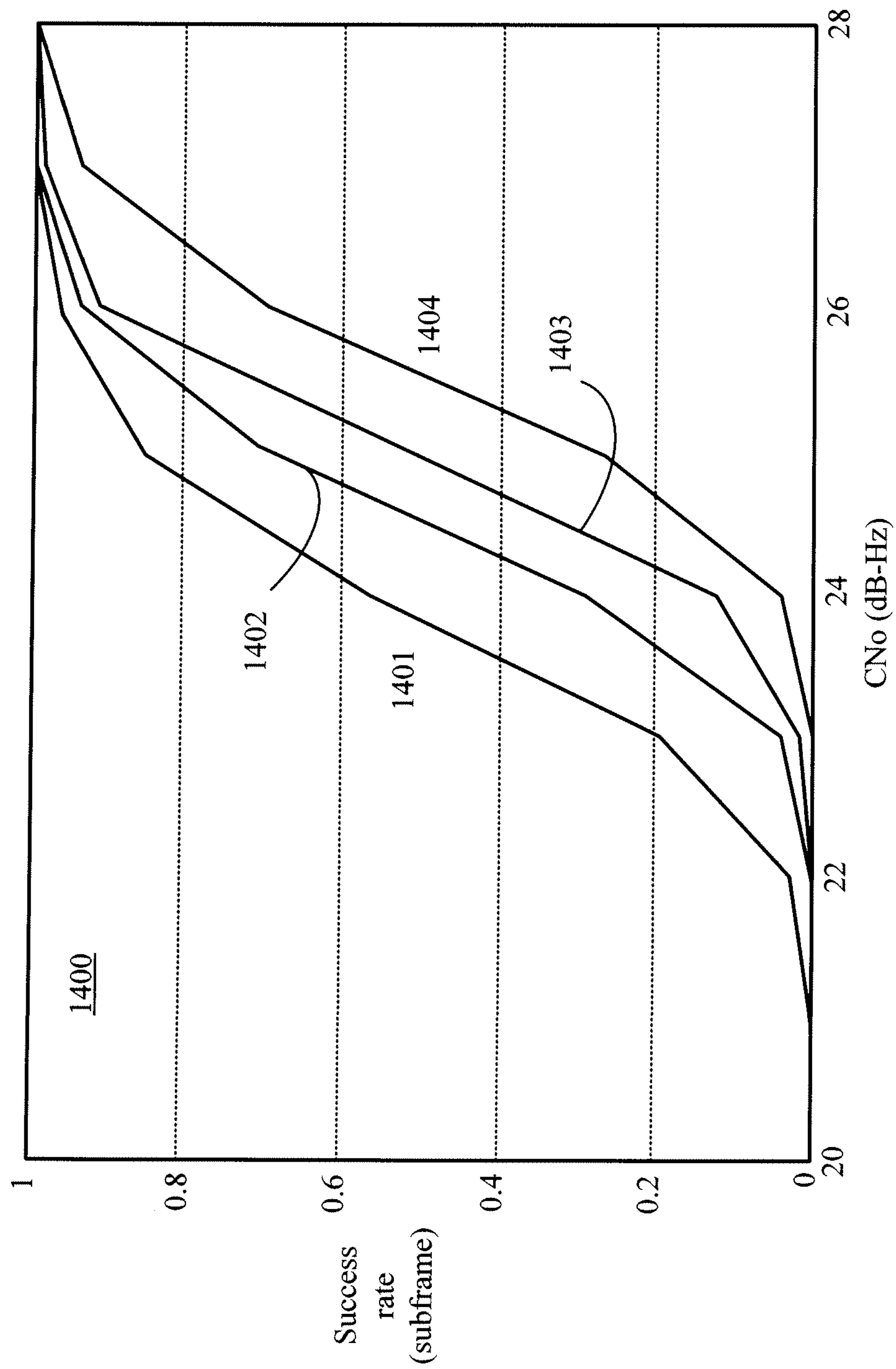

FIG. 14 illustrates the results of the four detection techniques for GLONASS sub-frames (e.g. 5 strings) using a graph 1400 plotting success rate versus CNo. In graph 1400, curve 1401 represents the results of basic coherent detection; curve 1402 represents the results of advanced differential detection that allows up to 1 corrected string for each sub-frame; curve 1403 represents the results of advanced differential detection that allows up to 5 corrected strings for each sub-frame; and curve 1404 represents the results of basic differential detection.

Figure 15:
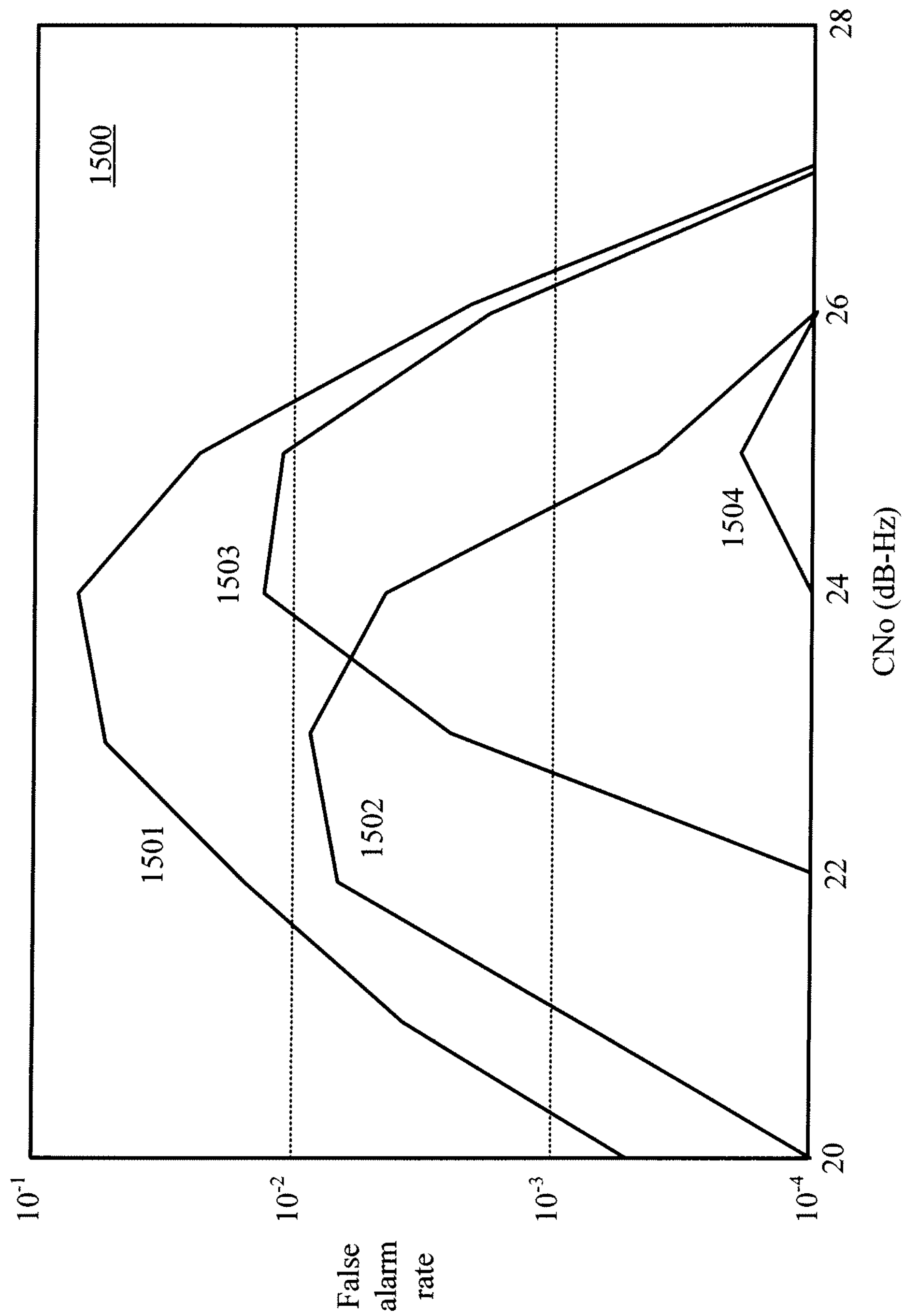

FIG. 15 illustrates the results of the four detection techniques for GLONASS sub-frames using a graph 1500 plotting false alarm rate versus CNo. In graph 1500, curve 1501 represents the results of advanced differential detection that allows up to 5 corrected strings for each sub-frame; curve 1502 represents the results of basic coherent detection; curve 1503 represents the results of advanced differential detection that allows up to 1 corrected string for each sub-frame; and curve 1504 represents the results of basic differential detection.

As shown by FIG. 15, the sub-frame false alarm rate for basic differential detection is quite low (i.e. 2e-4). In contrast, advanced differential detection (either of 1 or up to 5 corrected strings) has a high false alarm rate. Basic coherent bit detection has a false alarm rate comparable to that of advanced differential detection (up to 1 corrected string).

The results of FIGS. 14 and 15 are summarized in Table 4.

TABLE 4

Performance comparison for coherent and differential bit detection (the required C/No for 90% sub-frame success rate)

| Method | C/No (dB-Hz) | False alarm rate (Max) | Improvement (dB) |
|---|---|---|---|
| Differential-basic | 26.9 | 2e−4 | 0 |
| Differential-advanced (1) | 26.0 | 1.2e−2 | 0.9 |
| Differential-advanced (5) | 25.8 | 7e−2 | 1.1 |
| Coherent-basic | 25.4 | 9e−3 | 1.5 |

Optimally, the best output from either differential or coherent detection should be used. In other words, if only one technique decodes the sub-frame successfully, then that detection result should be used. In one embodiment, if both techniques decode the sub-frame successfully, then the detection technique with the lower false alarm rate should be used. Referring back to FIG. 4, a multiplexer control circuit 406 can make these determinations. Based on the above results, the order of preference for GLONASS can be ordered as follows: basic differential detection and basic coherent detection.

The embodiments described herein are not intended to be exhaustive or to limit the invention to the precise forms disclosed. As such, many modifications and variations will be apparent. Accordingly, it is intended that the scope of the invention be defined by the following Claims and their equivalents.

The invention claimed is:

1. A hybrid bit detection circuit for receiving global positioning bits from different types of satellite systems, the hybrid bit detection circuit comprising: a frequency lock loop (FLL) for receiving the global positioning bits from the different types of satellite systems and removing Doppler frequency error; an integrate and dump block coupled to an output of the FLL; a coherent detection circuit coupled to an output of the FLL and an output of the integrated and dump block; a coherent parity check block coupled to an output of the coherent detection circuit; a differential detection circuit coupled to the output of the integrate and dump block; a differential parity check block coupled to an output of the differential detection circuit, wherein the coherent detection circuit includes: a filter coupled to the output of the FLL; a subtractor for subtracting an output of the filter from the output of the FLL; an FLL noise removal block for receiving outputs of the subtractor and the integrate and dump block; a phase lock loop (PLL); a PLL control block for resetting the PLL based on output of the subtractor and PLL; a match filter for determining a maximum likelihood set of bits corresponding to the global positioning bits based on an output of the FLL noise removal block.

2. The hybrid bit detection circuit of claim 1, wherein the filter is a low pass filter.

3. The hybrid bit detection circuit of claim 1, wherein the match filter provides match results to the PLL.

4. The hybrid bit detection circuit of claim 1, wherein the match filter provides phase error results to the PLL.

5. The hybrid bit detection circuit of claim 1, wherein the PLL provides frequency and phase estimates to the match filter.

6. The hybrid bit detection circuit of claim 1, wherein the match filter uses a phase array, which is sized based on a number of bits of a sliding window.

7. The hybrid bit detection circuit of claim 1, wherein the PLL has step sizes based on a loop count, wherein each loop count is 20 ms.

8. The hybrid bit detection circuit of claim 1, wherein the PLL control block compares an estimated frequency offset between the PLL and the FLL.

9. The hybrid bit detection circuit of claim 8, wherein the PLL control block computes a frequency error based on the estimated frequency offset and compares the frequency error to a predetermined threshold.

10. The hybrid bit detection circuit of claim 9, wherein the PLL is reset when the frequency error is equal to or greater than the predetermined threshold.

11. A system for performing parity checks on a plurality of bits, the system comprising: a first parity check block coupled to an output of a coherent detection block, wherein the coherent detection block includes: a filter coupled to an output of a frequency lock loop (FLL); a subtractor for subtracting an output of the filter from the output of the FLL; an FLL noise removal block for receiving outputs of the subtractor; a phase lock loop (PLL); a PLL control block for resetting the PLL based on output of the subtractor and PLL; a match filter for determining a maximum likelihood set of bits corresponding to global positioning bits based on an output of the FLL noise removal block; a second parity check block coupled to an output of a differential detection block; and a multiplexer for selecting between an output of the first parity check block and an output of the second parity check block, wherein the plurality of bits are derived from global positioning bits associated with different types of satellite systems.

12. The system of claim 11, wherein when the type of satellite system is a global positioning system (GPS), all words in a sub-frame are required to pass parity to reduce a parity check false alarm rate.

13. The system of claim 11, wherein when the type of satellite system is GPS, specific bits of a predetermined data field in each sub-frame are verified to reduce a parity check false alarm rate.

14. The system of claim 13, wherein the predetermined data field is a telemetry (TLM) field and the specific bits have a fixed synchronization pattern.

15. The system of claim 14, wherein when the fixed synchronization pattern is inversed, then all sub-frame bits are flipped.

16. The system of claim 13, wherein the predetermined data field is a time of week (TOW) field and the specific bits are 17 bits of the TOW.

17. The system of claim 16, wherein the predetermined data field further includes a handover word (HOW) field and the specific bits further includes 3 bits of the HOW.

18. The system of claim 17, wherein when the 17 bits of the TOW and the 3 bits of the HOW are inversed, then all sub-frame bits are flipped.

19. The system of claim 13, wherein the predetermined data field includes a second word and a last word of a GPS sub-frame, and the specific bits include two last parity check bits of the second and last words.

20. The system of claim 19, wherein when the two last parity check bits of the second and last words are inversed, then all sub-frame bits are flipped.

21. The system of claim 11, wherein in the first parity check block when the type of satellite system is GPS, if bits[0:29] do not pass parity, then flipping bits[n] to determine if it passes parity, n being 0 to 29.

22. The system of claim 11, wherein in the second parity check block when the type of satellite system is GPS, if bits[0:29] do not pass parity, then flipping bits[n:29] to determine if it passes parity, n being 0 to 29.

23. The system of claim 11, further including a multiplexer control circuit that determines whether the first parity check block or the second parity check block provides a better score.

24. The system of claim 23, wherein the multiplexer control circuit selects results of one of the first and second parity check blocks when only one of the first and second parity check blocks decodes a sub-frame successfully.

25. The system of claim 23, wherein the multiplexer control circuit selects results associated with a lower false alarm rate when both the first and second parity check blocks decode a sub-frame successfully.

26. The system of claim 11, wherein when the type of satellite system is GLONASS, specific bits of a predetermined field in each string are verified to reduce a parity check false alarm rate.

27. The system of claim 26, wherein the predetermined field is a string identification (ID) field, and the specific bits are 4 bits of the string ID field.

28. The system of claim 27, wherein each parity check block determines whether the 4 bits increment by "1" based on a last 4-bit set, and if not, then throwing away a sub-frame.

29. The system of claim 11, wherein when the type of satellite system is GLONASS, if a number of corrected strings is greater than "1" for a sub-frame, then throwing away the sub-frame.

30. The system of claim 11, wherein in the first parity check block when the type of satellite system is GLONASS, if bits[0:84] do not pass parity, then flipping bits[n:n+1] to determine if it passes parity, n being 0 to 83.

31. The system of claim 11, wherein in the second parity check block when the type of satellite system is GLONASS, if bits[0:84] do not pass parity, then flipping bit[n] to determine if it passes parity, n being 1 to 84.

32. A system for receiving global positioning bits from different types of satellite systems, the system comprising: a frequency lock loop (FLL) for receiving the global positioning bits from the different types of satellite systems and removing Doppler frequency error; an integrate and dump block coupled to an output of the FLL; and a coherent detection circuit comprising: a filter coupled to the output of the FLL; a subtractor for subtracting an output of the filter from the output of the FLL; an FLL noise removal block for receiving outputs of the subtractor and the integrate and dump block; a phase lock loop (PLL); a PLL control block for resetting the PLL based on output of the subtractor and PLL; a match filter for determining a maximum likelihood set of bits corresponding to the global positioning bits based on an output of the FLL noise removal block; and a coherent parity check block coupled to an output of the coherent detection circuit.

* * * * *